United States Patent
Fuchs

[11] 3,723,171
[45] Mar. 27, 1973

[54] PROCESS FOR THE MANUFACTURE OF PVF SHAPED ARTICLES

[76] Inventor: Otto Fuchs, Holsteinstr. 44, 521 Troisdorf-Oberlar, Germany

[22] Filed: Sept. 15, 1970

[21] Appl. No.: 72,475

[30] Foreign Application Priority Data

Sept. 15, 1969 Germany..................P 19 46 611.6

[52] U.S. Cl..........................117/122 PF, 117/138.8 UF, 161 KP; 264/171, 264/216
[51] Int. Cl..........................................C09j 7/02
[58] Field of Search.....................117/76 A, 117/138.8 UF, 122, 161 KP;

[56] References Cited

UNITED STATES PATENTS

| | | | |
|---|---|---|---|
| 3,111,450 | 11/1963 | Stevens | 117/138.8 X |
| 3,364,049 | 1/1968 | Deak et al. | 116/138.8 X |
| 3,228,823 | 1/1966 | Usala et al. | 117/138.8 |
| 2,952,043 | 9/1960 | Uraneck et al. | 264/171 |
| 2,810,702 | 10/1957 | Bechtold et al. | 264/216 X |
| 2,600,681 | 6/1952 | Park et al. | 264/216 X |
| 3,218,348 | 11/1965 | McElroy et al. | 117/122 |
| 3,437,622 | 4/1969 | Dahl | 117/122 X |
| 3,515,773 | 6/1970 | Dahl | 117/122 |
| 2,949,380 | 8/1960 | Stuart | 117/161 X |
| 3,149,994 | 9/1964 | Congleton et al. | 117/72 X |
| 3,639,147 | 2/1972 | Benefiel | 117/72 X |

Primary Examiner—William D. Martin
Assistant Examiner—Bernard D. Pianalto
Attorney—Burgess, Dinklage & Sprung

[57] ABSTRACT

Improvements in adhering polyvinyl fluoride sheets to other materials by making a novel sheet composed of polyvinyl fluoride in sheet form and a layer of adhesive, preferably a polyurethane adhesive, on an appropriate surface, or portion of a surface of the polyvinyl fluoride sheet. This composite adhesive sheet must be made in a special way by coating a solution or dispersion of the polyvinyl fluoride onto a suitable surface, removing the solvent or dispersing medium to a residual content of about 0.4 to 0.8 weight percent, applying the adhesive, preferably as a solution or dispersion, in the area required, and then removing the remainder of the solvent or dispersant from both the polyvinyl fluoride sheet and the adhesive layer.

12 Claims, 2 Drawing Figures

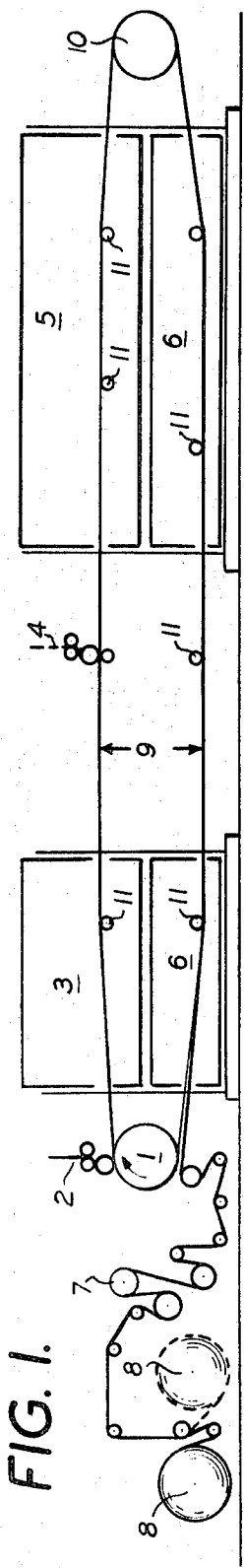
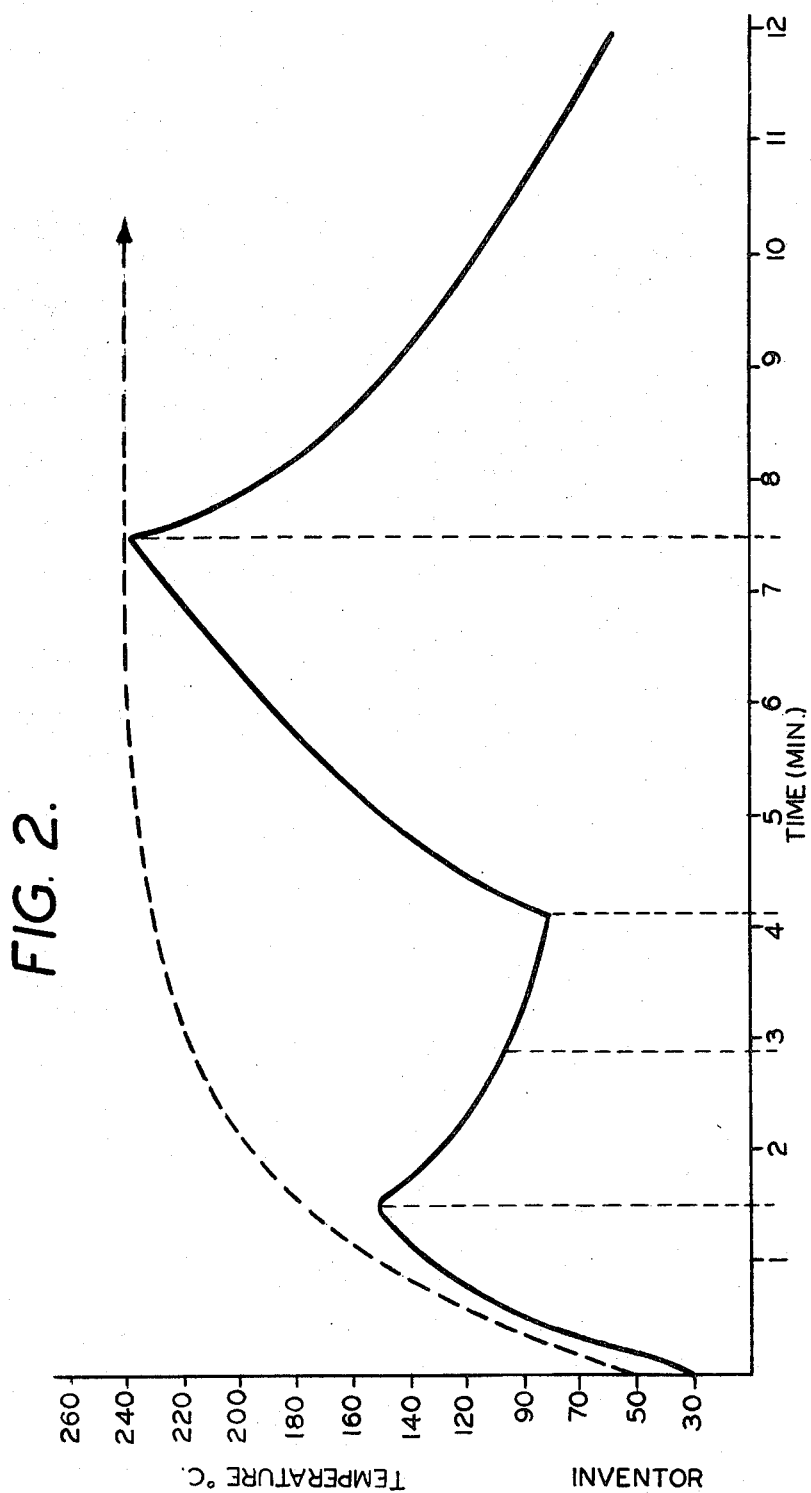
FIG. 1.
FIG. 2.
INVENTOR
OTTO FUCHS

PROCESS FOR THE MANUFACTURE OF PVF SHAPED ARTICLES

This invention relates to polyvinyl fluoride. It more particularly refers to a novel technique for making polyvinyl fluoride shaped articles, particularly films of sheets, adhesive.

Sheets of polyvinyl fluoride (PVF) are very resistant to weathering and corrosion; therefore they are highly suitable for use as laminating materials or coatings for other materials that are exposed to these influences. Such use, however, is impeded by the peculiar character of polyvinyl fluoride sheets in that they can be welded to one another, but they cannot be joined to other materials by adhesives. Accordingly, polyvinyl fluoride sheets do not adhere at all, or they adhere very poorly, to the materials that are to be protected, such as plastics, metals, building materials, wood products and cellulose products. This poor cementability of untreated polyvinyl fluoride sheets to the materials named is even exploited by using PVF sheets as inert separating sheets between layers of such materials.

It has been proposed to provide temperature-insensitive or resistant materials with a PVF covering by coating PVF dispersions onto the surface of these substances and then baking the polymer on. This method, however, can be used only with materials which withstand relatively high temperatures, such as metals, for example.

The poor adhering qualities of untreated PVF sheets are displayed both by sheets made by the casting process and by sheets made by other known manufacturing processes such as rolling, extruding or blowing. For example, it has been found that PVF sheets which have been made in a known manner by the casting process by applying a PVF dispersion to flat glass sheets or polished metal plates, then evaporating and completely removing the solvent or dispersing agent by the application of heat, as is conventional, are not cementable after removal thereof from the sheets or plates.

It is therefore an object of this invention to provide a novel, cementable polyvinyl fluoride material.

It is another object of this invention to provide a novel process of producing cementable, adherent polyvinyl fluoride shaped articles.

It is a further object of this invention to provide a novel, cementable, adhesive polyvinyl fluoride sheet.

Other and additional objects of this invention will become apparent from a consideration of this entire specification, including the claims and drawing hereof.

In accord with and fulfilling these objects, one aspect of this invention resides in making an adhesive polyvinyl fluoride shaped article by solvent or dispersion casting of the polymer into the desired shape; removing most, but not all, of the solvent or dispersant; applying an adhesive on appropriate, predetermined areas of the polyvinyl fluoride cast article; and then removing any residual solvent or dispersant.

The process of this invention for the preparation of cementable PVF sheets made by the casting process is characterized in that the sheet is incompletely set by evaporating the solvent or dispersing agent to a residual content of 0.8 weight percent to 0.4 weight percent, preferably 0.6 weight percent to 0.5 weight percent; cooling the sheet; then providing this cooled sheet, which still contains solvent or dispersing agent, with a high temperature stable adhesive coating, on the side that is to be made adhesive; and then evaporating away the remainder of the solvent or dispersing agent. The adhesive is preferably one which, upon the removal of the solvent or dispersant which was used to apply the adhesive, results in a dry film.

A PVF sheet treated in this manner can be cemented very well and firmly to other materials by the use of adhesives applied in this manner. Such cementing adhesive materials as are known for the use intended can be applied according to this invention without limitation. The adhesives are considered to be per se known. Any adhesive which does not decompose at the temperature necessarily used during the process of drying the cast sheet, which can amount to as much as 280° C is suitable. Another requirement for the adhesives is that they form a dry film.

It is desirable for the adhesive used in making the adhesive coating to be dissolved in a solvent and applied in such form to the still incompletely dry sheet. The solvent can be any solvent in which the particular adhesive concerned dissolves and which is compatible with the residual solvent in the polyvinyl fluoride sheet. Preferably, solvents or solvent mixtures are used whose boiling points are higher than the temperature to which the sheet is cooled after the evaporation of the main part of the solvent.

Examples of appropriate solvents are propylene carbonate, cyclohexanone, acetic acid ester, dimethylformamide and toluene, or mixtures of these compounds.

The application of the adhesive to the still incompletely solvent-free sheet can be performed by spreading, spraying or other known methods. To make the sheet according to the process of the invention cementable, the adhesive coating may be as thin as possible. It would suffice for the layer of dry cement film to have a thickness of a few molecules. In the application processes named above which are common in present commercial practice, enough adhesive solution is applied to produce a continuous dry film on the order of about 1 micron thick. Thicker adhesive films also produce a cementable sheet according to this invention, but these additional thicknesses add no improvement in the cementability of the polyvinyl fluoride sheets.

Cements which are made on a basis of polyisocyanates and polyhydroxyl compounds, and which are known as polyurethane adhesives, are especially desirable for the making of the adhesive coating of this invention. In this case, the two components, dissolved in an anhydrous and alcohol-free solvent if desired, are mixed together just before their application to the sheet. The ratio of polyisocyanate to the polyhydroxyl compound in the mixture is based on the number of hydroxyl groups in the polyhydroxyl compound which are to be provided for each isocyanate group. In general, a quantity of polyisocyanate is used which suffices to react with all of the hydroxyl groups in the polyhydroxyl compound. Nevertheless, a slightly lesser or slightly greater amount of polyisocyanate also produces the desired effect.

It is advantageous to use as the polyisocyanate the reaction product of one mol of trimethylol propane with three moles of tolylene diisocyanate; however, 4,4', 4''-triisocyanatotriphenylmethane, tris-(4-isocyanatophenyl)-thiophosphate or 4,4'-diisocyanatodiphenylmethane, for example, can also be used as polyisocyanate components.

Preferred polyhydroxyl group-containing components are branched polyesters prepared from adipic acid, hexanetriol and phthalic acid or simple bivalent alcohols with up to four carbon atoms, such as butylene glycol or diethylene glycol. The polyester can also be already partially cross-linked with a polyisocyanate before it is mixed with the polyisocyanate group and applied as a cement.

The solvents for the polyisocyanates and polyhydroxyl compounds and polyurethanes, are anhydrous and alcohol-free solvents such as ethyl acetate, trichloroethylene, chlorobenzene or methylenechloride or mixtures of these compounds. On account of its low boiling point, methylene chloride is used preferably in a mixture with ethyl acetate.

The manufacture of cementable PVF sheets according to the invention can be performed both by continuous methods and by discontinuous methods. In both cases a solution or dispersion of the PVF in a latent solvent is used. Suitable latent solvents are, among others, N-alkyl substituted, low, aliphatic carboxylic acid amides, such as N,N-dimethylformamide, N,N-dimethylacetamide, N,N-diethylformamide, N,N-dimethyl-γ-hydroxyacetamide, N,N-dimethyl-γ-hydroxy-butyramide, N,N-dimethyllactamide, N,N-dimethylmethoxyacetamide, N-methylformamide or N-methylacetamide. Also suitable are compounds containing carbonyl groups, such as acetophenone, acetylacetone, cyclohexanone, dibutylketone, isophorone, mesityl oxide, methylamylketone, 3-methylcyclohexanone, bis-(methoxymethyl)-urone, 2-piperidone, N-methyl-2-piperidone, N-ethyl-2-pyrrolidone, N-methyl-2-pyrrolidone, N-isopropyl-2-pyrrolidone, or 5-methyl-2-pyrrolidone.

However, cyclic esters of carbonic acid are also suitable at latent solvents, examples being ethylene carbonate, propylene carbonates, butylene carbonates or trimethylene carbonate. Also lactones, such as β-propiolactone, δ-valerolactone, γ,γ-dimethyl-δ-valerolactone, γ-valerolactone, γ-butyrolactone and its β and γ-substituted alkyl derivatives, α- and β-angelicalactone, ε-caprolactone, etc. Also suitable are dialkyl esters of phthalic acid, quinoline, isoquinoline, pyridine and tetramethylurea.

Propylene carbonate, dimethylformamide, isophorone or γ-butyrolactone and mixtures thereof are preferentially used as latent solvents.

Where a polyvinyl fluoride dispersion is to be used, it is preferable first to mix up a concentrated, thick paste of the solids and part of the dispersant, homogenize it, for example, by several passes through a roller mixer, then add the rest of the dispersant to bring the paste to the desired consistency, and finally remove all air by means of a vacuum.

In the discontinuous process, this paste or solution is applied to a glass plate or polished, grease-free metal plate, and heated until only about 0.4 to 0.8 weight percent of the solvent is left in the gelled sheet. The temperature during this driving off of most of the solvent depends on the boiling temperature of the solvent or solvent mixture. It is desirable, however, to perform the heating at an oven temperature of about 140° to 280° C, at which the heating time amounts to about 1½ to 2 minutes.

Then the sheet is cooled to a temperature at which it has solidified to such an extent that it is relatively mechanically wear-resistant; this is generally the case at temperatures below about 90° to 100° C. Except under special conditions, it is recommendable to cool the sheet to temperatures between about 80° and 90°C, so that the reheating that follows the coating thereof with the adhesive can start at a higher temperature level. Fundamentally, it is possible to let the sheet cool to room temperature and not apply the adhesive coating until then. This is recommendable whenever the solvent in the adhesive has a boiling point between 30° and 80°C, so that it will not immediately evaporate when the adhesive is applied to the still hot sheet.

Following the application of the adhesive, the sheet is reheated in order to drive off the rest of the solvent or dispersing agent. It is desirable again to use temperatures between 240° and 280°C for this purpose, if it is desired to avoid heating for too long a time. At this stated oven temperature, the driving off of the remainder of the solvent takes approximately twice the time required for the first heating. Thereafter the product is cooled.

After the final cooling, the sheet pretreated according to the invention can be wound in rolls, and can then be used for bonding to wood, plastics or metals with the special cements of the prior art for these materials but applied according to this invention.

The process of the invention can be performed continuously by applying a PVF dispersion by means of a spreading mechanism to a circulating metal band in a sheet casting machine and heating it by means of a preliminary setting tunnel to such an extent that the latent solvent sets the PVF and then most of it evaporates, but a very slight amount of solvent still remains in the surface and keeps the PVF in a slightly softened state. The heating time in this case amounts to about half of the time that is required in order to produce a finished, ready-do-use, solvent-free cast sheet which contains only slight solvent residues (less than 0.4 percent) and would represent the final state in which it would no longer be cementable. After passing through the preliminary setting oven, the band passes through a short cooling section in which the surface of the sheet can cool to such an extent that it is firm enough to be given a thin coat of an adhesive agent. Finally, the sheet on the metal band passes through a second, main setting oven, which is twice as long as the preliminary setting oven, in which all of the solvents are entirely evaporated. After subsequent cooling, the PVF sheet is taken from the metal band. It can be rolled up and stored, and can be cemented very well on the treated side by means of adhesives. The side of the sheet that faces the metal constitutes the outside of the sheet and can be given a very glossy or a mat appearance, as desired, depending upon the metal surface used.

The adhesives used in preparing the adhesive coating can also contain slight amounts of finely divided silicon dioxide or other known fillers which improve the wettability of the sheet and give it thixotropic qualities.

This invention will be best understood from a consideration of the following illustrative examples.

Example 1 (for purposes of comparison)

Using 40 parts of PVF powder with a K value of 77, and 60 parts of propylene carbonate dispersant, a PVF dispersion is prepared first by mixing the PVF with a portion of the solvent, homogenizing it in a roller mixer, and finally mixing the mixture with the rest of the propylene carbonate. This dispersion is freed of entrapped air by means of a vacuum and is then spread onto a flat, polished presser plate and heated for 3 minutes at 260° C in a circulating hot air oven to remove all of the solvent to a residual content of less than 0.4 weight percent. After cooling, the PVF sheet is pulled from the plate.

For the cementing:

The upper *side* of the PVF sheet is spread with an adhesive consisting of a mixture of 5 parts of a polyester containing urethane groups in a 70 percent solution in ethyl acetate and methylene chloride in a 1 : 1 ratio, 2.5 parts of a 75 percent ethyl acetate solution of the reaction product of 1 mol of trimethylol propane and 3 mols of tolylene diisocyanate, and 5 parts of cyclohexanone. Then the solvent was evaporated away at 120° C, the cross-linking was initiated, and strips of the sheet were applied to different cleaned materials, particularly to hard polyvinyl chloride (PVC). Even after long pressing and curing, the adhesion of the sheet must be considered to be poor on all of the materials. It can be easily stripped away from them. The peel-strength was <0.5 kg/cm.

Example 2

White-pigmented PVF sheets are prepared, as described in Example 1, from a dispersion consisting of 80 parts of PVF, 20 parts $TiO_2$ and 150 parts of propylene carbonate. The heating in the circulating hot air oven at 260° C is performed, however, for only 90 seconds in the first stage to a residual solvent content of 0.45 weight percent, and after a brief cooling time, the surfaces of the sheets are coated with the cement described in Example 1, except that 6 parts of propylene carbonate are used as the solvent instead of 5 parts of cyclohexanone. Then the solvents are completely evaporated away in a period of 3 minutes at 260° C in a circulating hot air oven.

The dried sheet can easily be cemented with good adhesion strength to hard PVC, wood or vulcanized fiber in the following manner: The PVF sheet is coated with a cement which consists of a mixture of 5 parts of a polyester containing urethane groups in a 70 percent solution of ethyl acetate and methylene chloride in a ratio of 1 : 1, 2.5 parts 70 a 75 percent solution in ethyl acetate of the reaction product of 1 mol of trimethylol propane with 3 mols of tolylene diisocyanate, and 5 parts of cyclohexanone. Then the solvent is evaporated at 120° C, the cross-linking reaction is started, and the sheet is pressed onto the supporting material. The strength of adhesion of the sheet exceeds the ultimate tensile strength of the PVF sheet.

The cementing to the supporting material can also be performed by coating the surface of the material to be cemented with the adhesive, and then pressing onto it the sheet pretreated according to the invention, as represented in the following Example 2a.

Example 2a

A solution of a copolymer made from a monomer mixture of 87 percent VC, 12 percent vinyl acetate and 1 percent maleic acid in cyclohexanone is applied to a hard PVC board and the solvent is evaporated. Then a PVF sheet prepared and rendered cementable according to Example 2 is applied to said impregnated PVC board and bonded at 120° C in a press. The bond cannot be separated.

Example 3

A pigmented and deaerated PVF dispersion of 80 parts PVF, 20 parts $TiO_2$ and 250 parts propylene carbonate, which has been prepared as described in Example 1, is applied by means of a reverse roll coater. Reference is now made to FIG. 1 of the drawing which is a schematic view of the process of this invention. In this drawing the reverse roll coater applies the polyvinyl fluoride dispersion to a circulating metal band 9 of a sheet casting machine which carries it through a hot-air heated preliminary setting tunnel drier 3 operating at 260° C. The metal band runs over a drive roll 1, an end roll 10, and band supporting rolls 11. The time of passage through the preliminary setting tunnel drier amounts to 90 seconds. In this period the PVF sets, and most of the solvent is evaporated and carried out of the drier with the hot air. After leaving the tunnel drier, the band passes through a short cooling section corresponding approximately to the length of the preliminary setting tunnel drier, where additional air-cooling is applied. After the sheet surface, which still contains residual solvent, has sufficiently cooled and become so firm that it can be coated without damage, a mixture of 5 parts of a solution of a polyester containing urethane groups in a 70 percent solution in ethyl acetate and methylene chloride (1 : 1), 2.5 parts of a 75 percent ethyl acetate solution of the reaction product of 1 mol of trimethylolpropane and 3 mols of tolylene diisocyanate, and 5 parts of propylene carbonate, is applied by means of a second coating mechanism 4. The sheet then passes on the metal band through a second, main setting tunnel drier 5 which is twice as long as the preliminary setting tunnel drier and is provided with hot-air heating and also has a temperature of 260° C, doing so within about 3 to 3.5 minutes. After cooling during the return of the band through an air-cooling tunnel 6, with the additional use, if necessary, of a cooling roll 7, the now cementable PVF sheet is taken from the metal band and rolled on rolls 8.

The temperatures during the continuous manufacture, according to this invention, are shown by the curve plotted in FIG. 2. The broken line shows the oven temperature.

The pass-through times given depend, of course, upon the temperature levels used and on the metal band temperature. If higher temperatures are selected, throughput time can be reduced accordingly, and also the temperatures of the preliminary and main setting driers can be made different from one another. Nevertheless, it has proven particularly desirable to keep the lengths of the preliminary and main setting driers constant in a ratio of about 1 : 2, and to adapt the temperatures and throughput speed to them, rather than change the lengths of the tunnels.

What is claimed is:

1. Process for the manufacture of adhesive polyvinyl fluoride shaped articles which comprises forming a dispersion of polyvinyl fluoride in a dispersant forming the same into an unfinished shaped article; evaporating the dispersing agent in the shaped article down to a residual content of 0.8 to 0.4 weight percent; cooling the resultant shaped article still containing dispersing agent; applying an adhesive onto a predetermined area of the surface of the cooled shaped article; and then removing the remainder of the dispersing agent to thereby form a dry film of adhesive on the polyvinyl fluoride.

2. Process as claimed in claim 1, wherein said adhesive is applied as a dispersion.

3. Process as claimed in claim 1, wherein said adhesive is a polyurethane.

4. Process as claimed in claim 3, wherein the reaction product of 1 mol of trimethyl propane with 3 mols of tolylene diisocyanate is used as the polyisocyanate portion of said polyurethane.

5. Process as claimed in claim 1, wherein said polyvinyl fluoride article is made in a discontinuous casting process.

6. Process as claimed in claim 1, wherein said polyvinyl fluoride article is continuously cast on a circulating metal band, which band passes through a preliminary setting drier, an approximately twice-as-long post-setting drier, and a cooling section therebetween where said adhesive is applied.

7. Process as claimed in claim 1, wherein said residual solvent is 0.5 to 0.6 weight percent.

8. Process as claimed in claim 1, wherein said dispersant is at least one member selected from the group consisting of propylene carbonate, cyclohexanone, toluene, N,N-dimethyl formamide, N,N-dimethyl-$\gamma$-hydroxy acetamide, N,N-dimethyl-$\gamma$-hydroxybutyramide, N,N-dimethyllactamide, N,N-dimethyl methoxyacetamide, N-methyl formamide, N-methylacetamide, acetophenone, acetylacetone, dibutylketone, isophorone, mesityl amyl ketone, 3-methyl cyclohexanone, bis-(methoxymethyl)-urone, 2-piperidone, N-methyl-2-piperidone, N-ethyl-2-pyrrolidone, N-methyl-2-pyrrolidone, N-isopropyl-2-pyrrolidone, 5-methyl-2-pyrrolidone, ethylene carbonate, butylene carbonate, trimethylene carbonate, $\beta$-propiolactone, $\delta$-valerolactone, $\gamma,\gamma$-dimethyl-$\delta$-valerolactone, $\gamma$-valerolactone, $\gamma$-butyrolactone, $\alpha$-angelicalactone, $\beta$-angelicalactone, $\epsilon$-caprolactone, dialkyl phthalates, quinoline, isoquinoline, pyridine and tetramethylurea.

9. Process as claimed in claim 3, wherein said polyurethane adhesive is applied as a dispersion.

10. Process as claimed in claim 9, wherein said dispersant comprises at least one member selected from the group consisting of ethyl acetate, trichloroethylene, chlorobenzene, and methylene chloride.

11. Process as claimed in claim 1, wherein said adhesive is high temperature stable and forms a dry film.

12. A shaped article of polyvinyl fluoride having a polyurethane adhesive bonded to predetermined areas of the surface thereof made by the process claimed in claim 1.

* * * * *

UNITED STATES PATENT OFFICE
CERTIFICATE OF CORRECTION

Patent No. 3,723,171         Dated March 27, 1973

Inventor(s) OTTO FUCHS

It is certified that error appears in the above-identified patent and that said Letters Patent are hereby corrected as shown below:

Under "References Cited", "Deak et al  116/138.8X" should read --Deak et al  117/138.8X--.

Column 1, line 5, "of" should read --or--.

Column 5, line 50, "70" should read --of--

Signed and sealed this 8th day of January 1974.

(SEAL)
Attest:

EDWARD M. FLETCHER, JR.
Attesting Officer

RENE D. TEGTMEYER
Acting Commissioner of Patents